US006192316B1

United States Patent
Hornby

(10) Patent No.: US 6,192,316 B1
(45) Date of Patent: Feb. 20, 2001

(54) FRACTURE DISCRIMINATION USING BOREHOLE FREQUENCY RESPONSE OF STONELEY WAVES

(75) Inventor: Brian E. Hornby, Plano, TX (US)

(73) Assignee: Atlantic Richfield Company, Chicago, IL (US)

( * ) Notice: Under 35 U.S.C. 154(b), the term of this patent shall be extended for 0 days.

(21) Appl. No.: 09/320,486

(22) Filed: May 26, 1999

(51) Int. Cl.$^7$ ........................................................ G01V 1/40

(52) U.S. Cl. ................................................ 702/6; 367/38

(58) Field of Search ............................ 702/6; 367/76, 367/27, 38; 73/152.47

(56) References Cited

U.S. PATENT DOCUMENTS

| | | | |
|---|---|---|---|
| 4,594,691 | 6/1986 | Kimball et al. ......................... | 367/72 |
| 4,740,928 | * 4/1988 | Gutowski ................................. | 702/6 |
| 4,819,214 | * 4/1989 | Gutowski et al. ....................... | 702/6 |
| 4,831,600 | 5/1989 | Hornby et al. .......................... | 367/31 |
| 5,616,840 | * 4/1997 | Tang ................................. | 73/152.05 |
| 5,644,550 | * 7/1997 | Priest ....................................... | 702/6 |
| 6,106,561 | * 8/2000 | Farmer ................................... | 703/10 |

OTHER PUBLICATIONS

Hornby et al., "Fracture evaluation using reflected Stoneley-wave arrivals", *Geophysics*, vol. 54, No. 10 (Oct. 1989), pp. 1274–1288.

Kostek, et al., "The interaction of tube waves with wellbore fractures, Part I: Numerical models", *Geophysics*, vol. 63, No. 3 (May–Jun. 1998), pp. 800–808.

Kostek, et al., "The interaction of tube waves with wellbore fractures, Part II: Analytical models", *Geophysics*, vol. 63, No. 3 (May–Jun. 1998), pp. 809–815.

Tezuka, et al., "Modeling of low-frequency Stoneley-wave propagation in an irregular borehole", *Geophysics*, vol. 62, No. 04 (1997), pp. 1047–1058.

Endo et al., "Fracture evaluation from inversion of Stoneley transmission and reflections", *48th SPE Annual International Meeting*, (Soc. Petr. Eng., 1998).

Tezuka, et al., "Modeling of low-frequency Stoneley wave propagation in an irregular borehole", *Expanded Abstracts: 64$^{th}$ Annual International Meeting*, Paper No. BG1.7, (SEG, 1994), pp. 24–27.

Lang, et al., "Estimating slowness dispersion from arrays of sonic logging waveforms," *Geophysics*, vol. 52, No. 4 (Apr., 1987), pp. 530–544.

Kimball and Marzetta, "Semblance processing of borehole acoustic array data", *Geophysics*, vol. 49 (1984), pp. 274–281.

Dey–Sarkar and Wiggins, "Source deconvolution of teleseismic P wave arrivals between 14° and 40°", *J. Geophys. Res.*, vol. 81 (1976), pp. 3633–3641.

(List continued on next page.)

*Primary Examiner*—Christine Oda
*Assistant Examiner*—Victor J. Taylor
(74) *Attorney, Agent, or Firm*—James A. Gabala; Robert E. Sloat; Rodney M. Anderson

(57) ABSTRACT

A computer system (30) and method of operating the same to analyze well log data so as to distinguish fractures from drilling artifacts, such as caves, washouts, and breakouts, is disclosed. According to the disclosed system and method, a Stoneley wave well log obtained at a plurality of depths is analyzed at a low and a high frequency, to generate a low frequency reflection coefficient trace over depth and a high frequency reflection coefficient trace over depth. Comparison of these reflection coefficient traces with one another will indicate whether a reflecting feature includes a fracture (as indicated by good low frequency response) or a cave, washout, or other artifact (as indicated by good high frequency response), or both. The particular methods disclosed include the generation of the reflection coefficient traces through back-projection stacking of deconvolved impulse traces at both frequencies, and applying and evaluating an envelope function to the stacked traces.

18 Claims, 9 Drawing Sheets

OTHER PUBLICATIONS

Tang and Jackson, "Fracture analysis using borehole Stoneley wave transmission and reflection data", *Expanded Abstracts: 66th Annual International. Meeting*, (SEG, 1996), pp. 166–169.

Gelinsky and Tang, "Fast forward modeling of Stoneley waves for irregular boreholes and heterogeneous formations", *Expanded Abstracts: 68th Annual International Meeting*, Paper BG 3.5 (SEG, 1998), pp. 166–169.

* cited by examiner

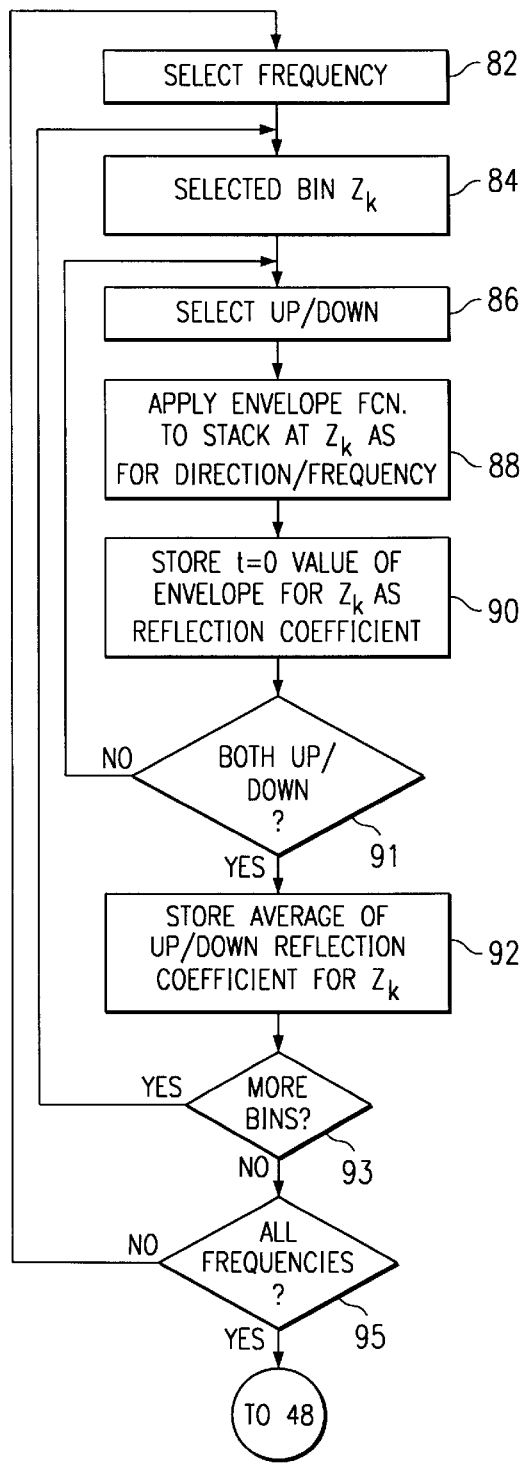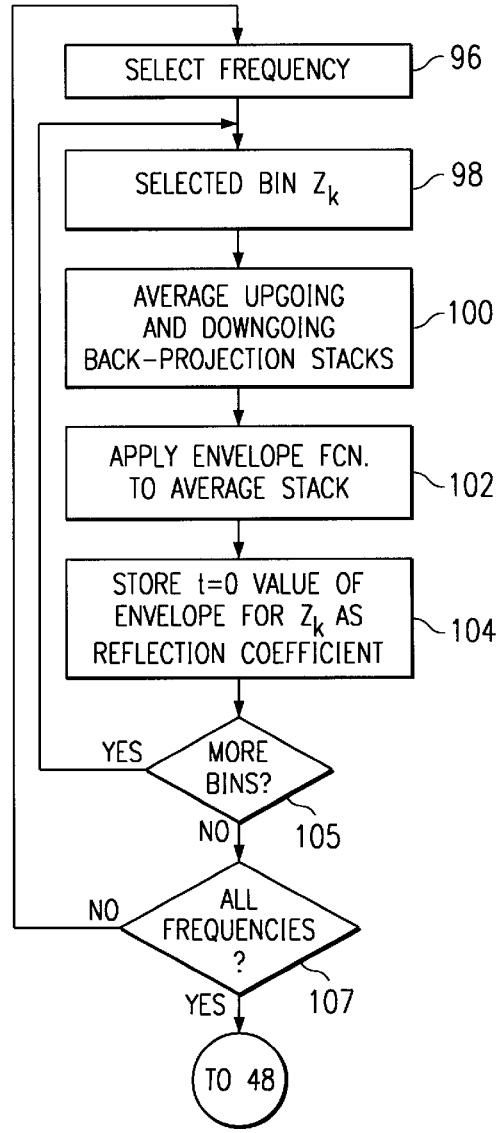

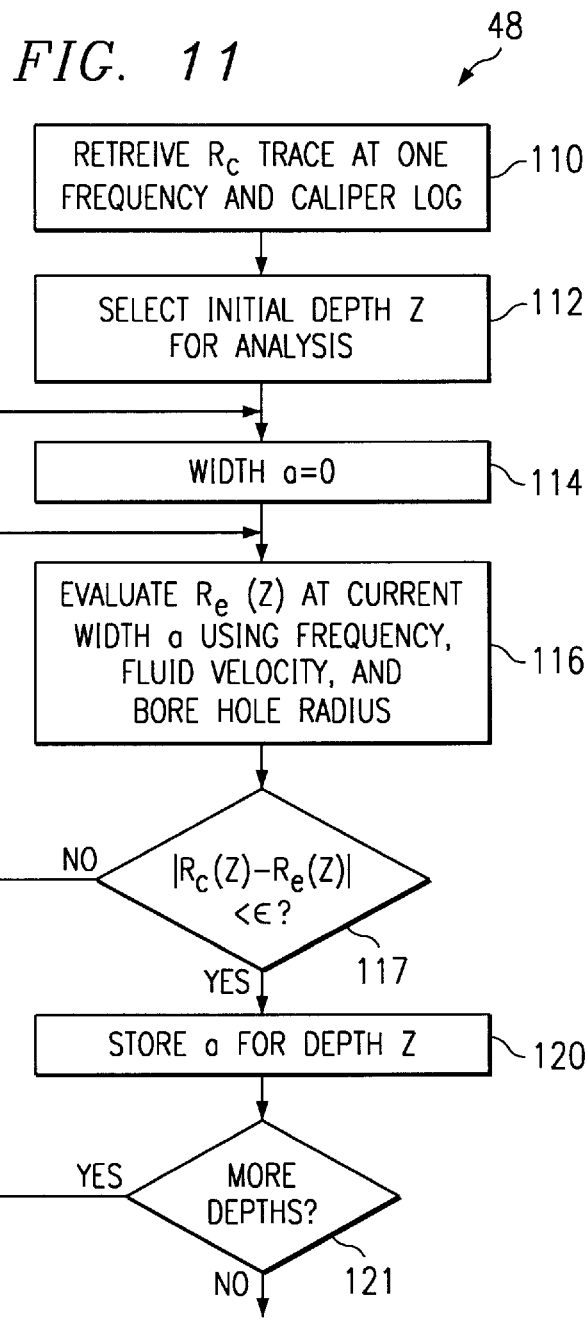

FRACTURE DISCRIMINATION USING BOREHOLE FREQUENCY RESPONSE OF STONELEY WAVES

BACKGROUND OF THE INVENTION

This invention is in the field of oil and gas prospecting, and is more specifically directed to the interpretation of well log signals to detect potential hydrocarbon reservoirs.

In the field of oil and gas prospecting and production, geophysical well logging is a commonly-used method of obtaining information about subsurface geology in the vicinity of a wellbore (or borehole), during and after the drilling process. As is fundamental in this field, well logging is accomplished by the lowering of a logging tool into the wellbore, and by operating the logging tool to obtain measurements at selected depths therewithin, for example as the tool is being withdrawn from the wellbore.

Many technologies are commonly used in obtaining various types of well log measurements. These technologies range from a simple caliper that directly measures the diameter of the wellbore over its depth, to the commonly used gamma-ray log that measures the natural radioactivity of the formations surrounding the wellbore, from which certain important formation types such as shales may be identified. Other types of well log measurements include density logs derived from gamma-ray backscatter measurements, sonic logs from which acoustic velocity may be derived as a function of depth, and the like. The resulting well log measurements are typically "tied" to seismic surveys at the drilling locations, thus calibrating the seismic surveys to the more direct physical measurements provided by conventional well logs.

As is also well known in the art, fractures in the earth are of particular interest in the prospecting of oil and gas reserves. Fractures are of particular significance in regions of the earth at which the subsurface formations otherwise have low permeability and low porosity, as the ability to retrieve oil and gas products from such formations depends directly upon the number and size of fractures in those formations. Secondary recovery, in which fluids are injected into producing formations to displace and thus retrieve hydrocarbons after reservoir pressure has dropped below the producing threshold, also greatly depends upon the presence of fractures. Information such as the depth at which fractures are intersected by the wellbore, as well as attributes of the fractures (e.g., strike and dip), are useful in analysis of the formation.

Fracture analysis has historically depended, to a large degree, upon core samples that are directly obtained from the formations surrounding a wellbore. However, core sampling is an expensive process, and one that is inherently limited to small sample locations. Furthermore, heavily fractured formations are often quite fragile, so that the obtaining of core samples therefrom can be difficult. In addition, considering that the core sample, once removed, is no longer subject to the stresses that were present in the earth itself, any sort of pressure or stress analysis is rendered suspect.

Well logs based upon the imparting of Stoneley waves (or "tube" waves) along a wellbore have been used in the art to locate fractures intersected by the wellbore. For example, the well log tool described in U.S. Pat. No. 4,831,600 includes a source for generating Stoneley waves, and an array of receivers spaced along the tool. This tool is used to sense the reflection of imparted Stoneley waves from fractures intersected by the wellbore. The reflection of Stoneley waves from such fractures is caused by fluid movement into the fracture, which generates a secondary Stoneley wave that is proportional to the width of the fracture. As described therein, analysis of the reflected signals allows the analyst to locate the depth of the fractures, as well as the width of the fracture (derived from an estimated reflectivity parameter). Further description of this conventional approach is provided in Hornby, et al., "Fracture evaluation using reflected Stoneley-wave arrivals", *Geophysics*, Vol. 54, No. 10 (October 1989), pp. 1274–1288.

It has been found, however, that the Stoneley wave measurement and analysis described in U.S. Pat. No. 4,831,600 and in the Hornby, et al. article is unable to distinguish between a true formation fracture, on one hand, and a cave, washout, breakout, or other artifact of the drilling process, on the other hand. It has been observed, in connection with the present invention, that any change in wellbore diameter, not just an intersected fracture, can cause the generation of a secondary Stoneley wave. By way of definition, a cave is a local enhancement of the borehole that is caused by the drilling process. Various types of caves are commonly encountered in the drilling of a borehole. One type of cave, referred to as a washout, is a local widening of the wellbore diameter due to an overpressure in the drilling fluid relative to the surrounding formation; a breakout corresponds to a shallow caving along the wellbore due to horizontal stress anisotropy as a result of the drilling operation. A cave may also be a drilling-induced enhancement of the opening of a formation fracture. Conventional Stoneley wave logging of wellbores having these drilling artifacts may indicate a formation fracture at locations of these artifacts (i.e., false positives), or may otherwise overestimate the fracture density along the wellbore.

It is therefore desirable to be able to distinguish between true formation fractures and drilling artifacts in Stoneley wave well logging of a wellbore.

It has further been discovered, in connection with the present invention, that Stoneley waves can also be reflected from locations along a wellbore at which a sharp change in lithology is present. Such reflections are due to discontinuities in the Stoneley wave velocity through the surrounding formation. While knowledge of the locations of lithology changes along a wellbore is of some importance, this information can be acquired by other techniques (such as velocity logs), and as such it is therefore desirable that reflections from lithology changes not interfere with reflections from fracture formations in the interpretation of the well log.

By way of further background, differences in the frequency response to Stoneley waves between true fractures and drilling artifacts such as caves and washouts have been discovered. Attention in this regard is directed to Kostek, et al., "The interaction of tube waves with wellbore fractures, Part I: Numerical models", *Geophysics*, Vol. 63, No. 3 (May-June 1998), pp. 800–808, and to Kostek, et al., "The interaction of tube waves with wellbore fractures, Part II: Analytical models", *Geophysics*, Vol. 63, No. 3 (May-June 1998), pp. 809–815, in this regard. As described therein, a washout not at a fracture location has poor low frequency response and good high frequency response, while a fracture has good low frequency response and poor high frequency response; a washout at a fracture location has the good low frequency response of a fracture and the good high frequency response of a washout. These references disclose that behavior of the reflection coefficient versus frequency can be used to identify regions where only washouts or caves exist. In this regard, attention is directed to the Kostek, et al. article at page 815.

By way of further background, the compensation of Stoneley wave well log data for the effects of borehole enlargements using forward modeling of the Stoneley wave based on the caliper log, is known in the art. Examples of this approach are disclosed in Tezuka, et al., "Modeling of low-frequency Stoneley-wave propagation in an irregular borehole", *Geophysics,* Vol. 62, No. 04 (1997), pp. 1047–1058, and in Endo et al., "Fracture evaluation from inversion of Stoneley transmission and reflections", 48th *SPE Annual International Meeting,* (Soc. Petr. Eng., 1998). According to these references, the field data are compensated for borehole enlargements using synthetic Stoneley wave responses based on a caliper log, and then subtracting that synthetic response from the field data. The corrected data are then processed for Stoneley wave reflectivity over a single frequency band. These conventional procedures depend upon very accurate measurements of the borehole diameter with the caliper log, and also require full-fidelity matching of the synthetic data with field data. However, a caliper log may not accurately and entirely represent the whole borehole; for example, caves that are caused by local enlargement of the fracture will not normally be picked up by caliper logs, but will still affect the Stoneley wave response.

BRIEF SUMMARY OF THE INVENTION

It is therefore an object of the present invention to provide an automated method of interpreting well log data to identify fractures in subsurface formations at the wellbore.

It is a further object of the present invention to provide such a method in which fractures may be distinguished from caves and washouts along the wellbore.

It is a further object of the present invention to provide such a method in which fractures may be identified in such a manner that the frequencies of both false positives and false negatives are reduced.

It is a further object of the present invention to provide such a method in which fractures may be distinguished from lithology changes along the borehole.

It is a further object of the present invention to provide such a method that relies upon stand-alone Stoneley wave data itself and the physical response thereto from fractures, caves, and other wellbore artifacts, thus avoiding reliance upon external inputs and synthetic data.

Other objects and advantages of the present invention will be apparent to those of ordinary skill in the art having reference to the following specification together with its drawings.

The present invention may be implemented into a well logging method and programmed system for performing the same, in which Stoneley wave well log signals are obtained over varying source-receiver offset of the logging tool, for example by using a tool having a single source and multiple receivers along its length. The frequency response of one or more receivers over depth is transformed into the frequency domain, so that a specific high frequency and a specific low frequency may be determined. The frequencies so selected preferably are near the highest and lowest frequencies having reasonable energy, so that distinctions may be made between formation cracks, on one hand, and caves and breakouts, on the other hand. Constant offset gathers, corresponding to signals from single source-receiver pairs over depth, are used to enhance the reflection signal relative to the direct Stoneley wave signal; the impulse response of the potential fracture is then retrieved from the reflection signal. Back-projection is then used to combine data from multiple receiver offsets to each depth, following which the reflection coefficient at each of the selected frequencies is derived. Interpretation of the reflection coefficient values versus frequency then indicates whether the reflector is a fracture or an artifact of the drilling process.

BRIEF DESCRIPTION OF THE SEVERAL VIEWS OF THE DRAWING

FIGS. 9*a* and 9*b* are flow charts illustrating methods of deriving reflection coefficient traces in the method of FIG. 4, according to first and second preferred embodiments of the present invention.

FIG. 11 is a flow chart illustrating a method of estimating fracture width according to an alternative embodiment of the present invention.

DETAILED DESCRIPTION OF THE INVENTION

Figure 1:
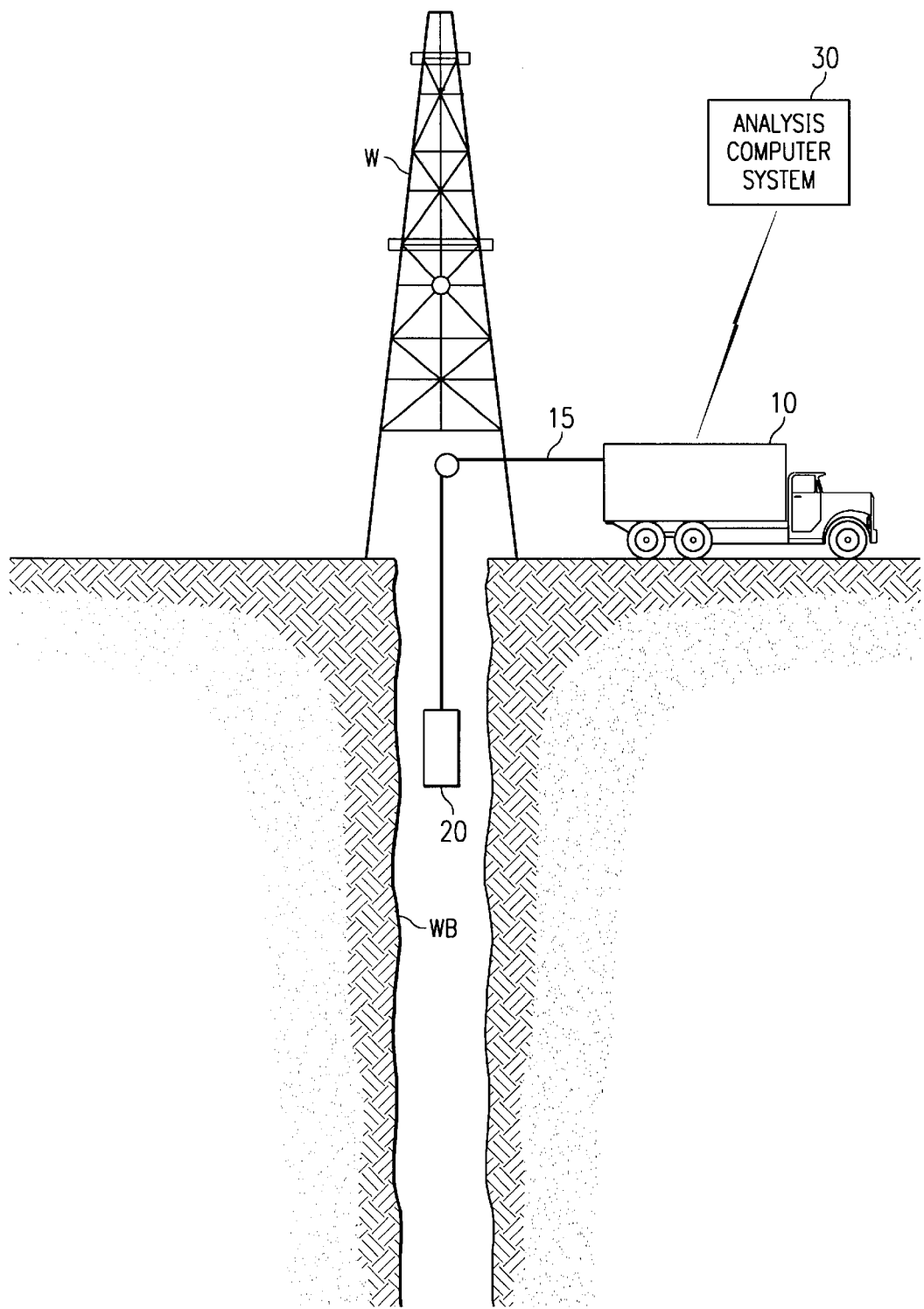
FIG. 1 is a cross-sectional elevation of a portion of the earth illustrating the obtaining of a well log according to the preferred embodiments of the present invention.

Referring now to FIG. 1, a Stoneley wave well logging operation performed according to the preferred embodiment of the invention will be described in detail. In the example shown in FIG. 1, well logging of uncased wellbore WB at well W is being performed. In the land-based survey shown in FIG. 1, recording station 10 is a well logging truck which is connected to tool 20 by way of wireline 15; in a marine survey, a wireline unit equivalent in function to the truck of FIG. 1 is deployed on the offshore drilling platform to perform the well logging. Tool 20 is a Stoneley wave well logging tool, as will be described in further detail below. Recording station 10 feeds out or retracts wireline 15 to position tool 20 at the desired depth within wellbore WB in the conventional manner, and receives measurement signals from tool 20 along wireline 15.

The received signals are recorded by recording station 10, and are communicated thereby to analysis computer system 30, for example by way of wireless communication as suggested by FIG. 1, or simply by transporting disk, tape, or another medium to the location of analysis computer system 30. Alternatively, analysis computer system 30 may be deployed onsite at well W, and in fact may be included within recording station 10 if desired.

Figure 2:
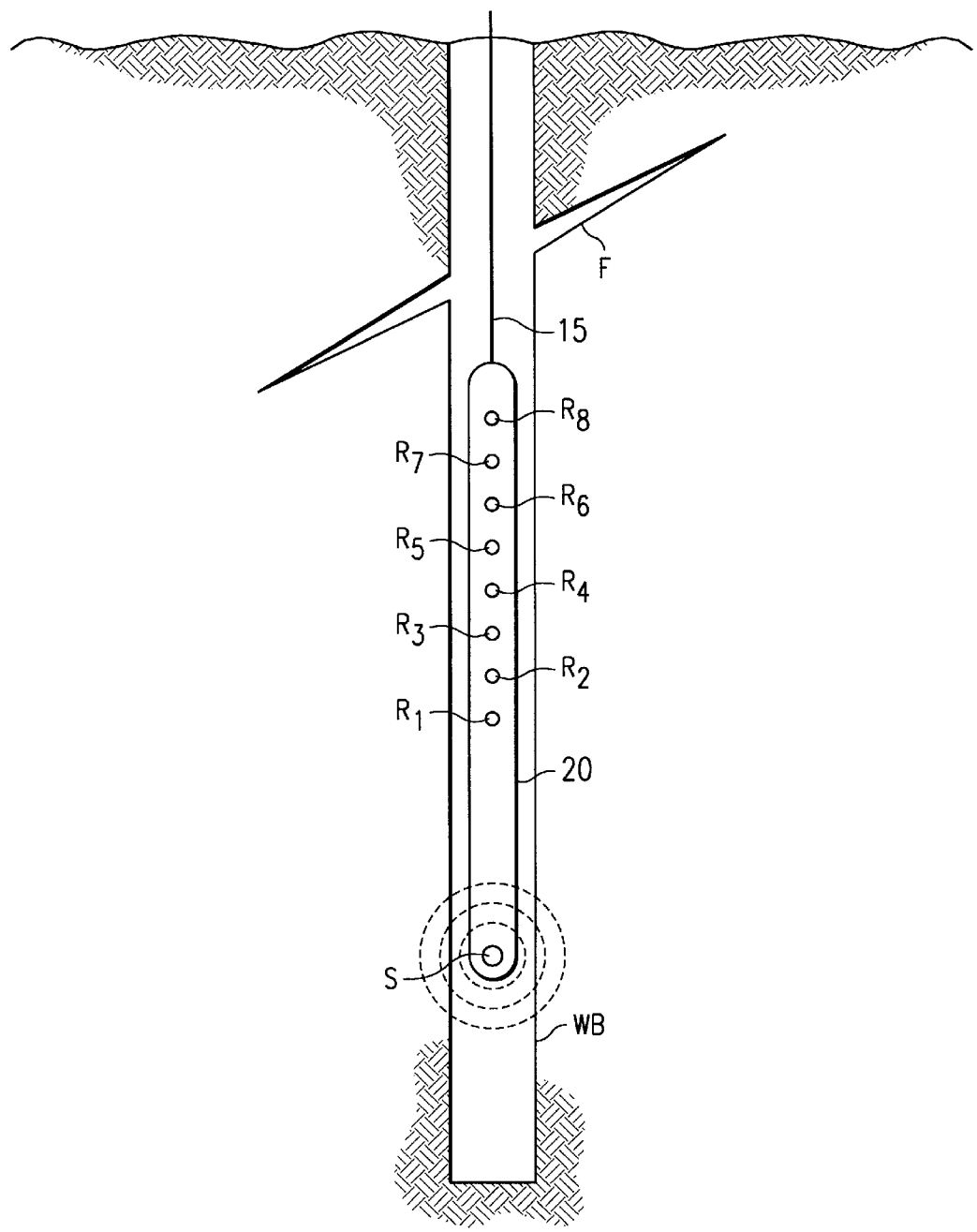
FIG. 2 is a view of a well log tool according to the preferred embodiments of the present invention.

Referring now to FIG. 2, the arrangement of tool 20, as deployed into wellbore WB, will now be described in detail. Tool 20 may correspond to a conventional downhole acoustic well log tool, such as the DSI Dipole Shear Sonic Imager tool available from Schlumberger; however, it is preferred that tool 20 have better low frequency response than such a conventional tool. In its construction, tool 20 is generally arranged to include acoustic source S near its bottom end, and an array of receivers R spaced apart therefrom, and in a linear arrangement extending to near the top end of tool 20. The spacing between source S and its nearest receiver $R_1$ typically ranges from five to twenty-five feet. The spacing among receivers R of tool 20 is preferably selected to correspond to the distance along the depth of wellbore WB at which measurements are desired. For example, receivers $R_1$ through $R_7$ may typically be separated by six inches. The number of receivers R provided in tool 20 is selected so that the overall span between the top and bottom receivers R corresponds generally to at least the wavelength of the Stoneley wave energy to be analyzed; typically, the number of receivers R may number from six to twelve. In the example of FIG. 2, tool 20 has nine receivers $R_1$ through $R_8$. Further description of a conventional example of tool 20 is provided in U.S. Pat. No. 4,594,691, incorporated herein by this reference.

As illustrated in FIG. 2, tool 20 is deployed within wellbore WB, suspended from wireline 15. In operation, source S emits acoustic energy that takes the form of a spherical waveform as illustrated in FIG. 2. In its upward travel, the spherical waveform will be confined primarily within wellbore WB, and will have an upward traveling wavefront that is commonly referred to in the art as a Stoneley wave. The Stoneley wave will travel upwardly past receivers R; receivers R will detect this direct arrival wave in turn, and will each generate a time-domain signal corresponding to this direct arrival. The Stoneley wave will continue in its upward travel, past the top of tool 20.

In the example of FIG. 2, the Stoneley wave will be effectively "reflected" from fracture F. Upon the Stoneley wave reaching a conductive fracture F intersected by wellbore WB, fluid will move into and out of the volume of fracture F, causing a change in pressure. This change in pressure creates a secondary acoustic source in wellbore WB at the location of its intersection of fracture F, generating a Stoneley wave originating at fracture F; in the example of FIG. 2, this generated wave is a downward-traveling Stoneley wave. This secondary Stoneley wave arrival is commonly referred to in the art as a "reflected Stoneley wave", as the secondary arrival appears as a "reflection" signal at receivers R (by analogy to seismic surveys). This reflected arrival is detected by receivers R in turn, which generate signals corresponding to the arrival. Accordingly, receivers R in tool 20 receive both direct and reflected arrivals of the energy imparted by source S, and generate electrical signals according thereto that are communicated over time from tool 20 to recording station 10 along wireline 15 (FIG. 1).

In operation, the Stoneley wave well log data is obtained by operating tool 20 in the conventional well log manner. Typically, tool 20 will be lowered into wellbore WB to the deepest point from which information is desired. Source S will be activated, and acoustic energy imparted thereby into wellbore WB; during this time, receivers R will be enabled to detect the direct and reflected wave arrivals, and to generate electrical signals in response thereto. The acoustic energy imparted by source S, according to the present invention, is a burst of energy that approximates an impulse, so as to provide broadband response. Sufficient time should be allowed after each firing of source S for each receiver R to receive reflected arrivals from wellbore features located some distance away from tool 20. A typical measurement duration at each depth is on the order of 40 msec. Following the completion of the measurement period, tool 20 is raised by the desired increment, preferably by the separation distance between adjacent ones of receivers R in tool 20 (e.g., six inches), and the measurement repeated. This operation continues until the depth interval of interest within wellbore WB is fully logged. Of course, this logging process may be performed in other alternative and equivalent ways, such as by lowering tool 20 into wellbore WB in the logging process, rather than raising tool 20 as described above.

According to the preferred embodiment of the present invention, processing of these well log signals is performed to determine both the location of structures such as fracture F, but also some indication of the nature of the reflecting feature intersected by wellbore WB. According to the preferred embodiment of the invention, this signal processing is carried out in an automated manner, preferably using modern computing equipment.

Figure 3:
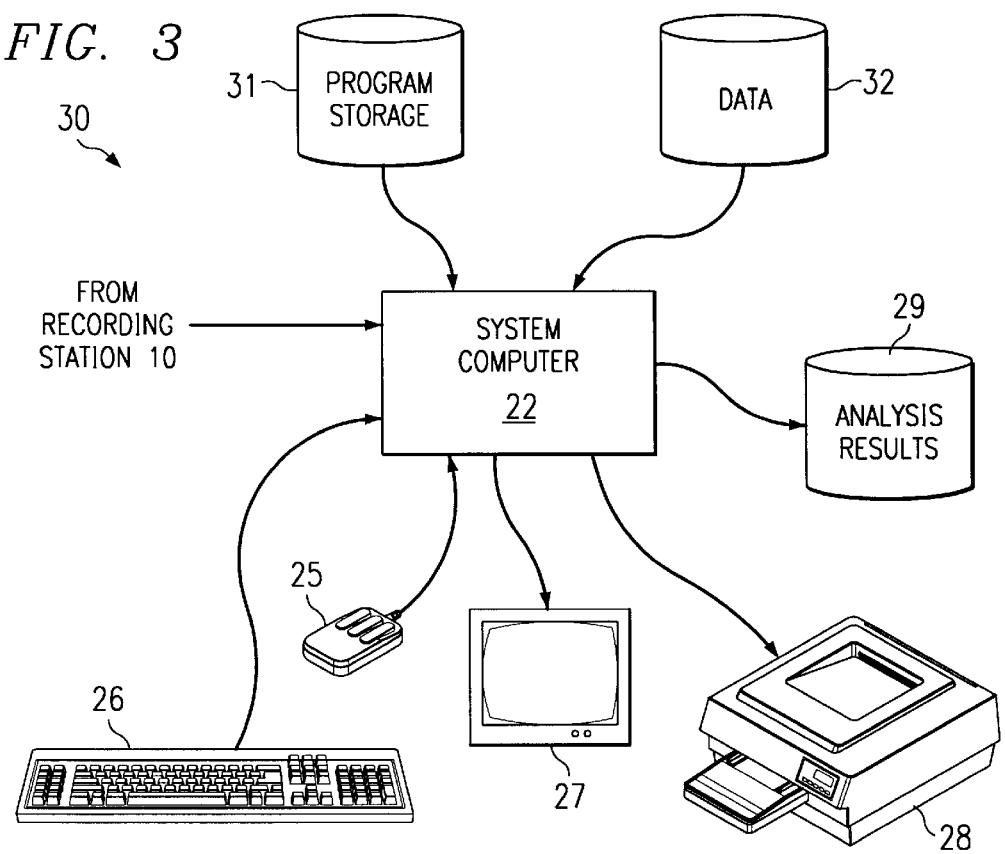
FIG. 3 is an electrical diagram, in block form, of a computer system into which the preferred embodiments of the present invention may be implemented.

As noted above, recording station 10 is in direct or indirect communication with analysis computer system 30. Referring now to FIG. 3, the construction of analysis computer system 30 according to the preferred embodiment of the present invention, will now be described. This description of analysis computer system 30 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

Analysis computer system 30 includes system computer 22, which may be implemented as any conventional personal computer or workstation, preferably a UNIX-based workstation such as a SPARCstation available from Sun Microsystems, Inc., implemented either in standalone fashion or as part of a network arrangement System computer 22 is in communication with disk storage devices 29, 31, 32, which are preferably external hard disk storage devices in a network. It is contemplated that disk storage devices 29, 31, 32 are conventional hard disk drives, and as such will be implemented by way of a local area network or by remote access. Of course, while disk storage devices 29, 31, 32, are illustrated as separate devices, a single disk storage device may of course be used to store any and all of the program instructions, measurement data, and results as desired.

In this embodiment of the invention, signals obtained from recording station 10, are received by system computer 22 and stored in digital form on disk storage device 30. System computer 22 can then retrieve the appropriate data from disk storage device 30 to perform the desired analysis, according to program instructions corresponding to the preferred embodiment of the invention as described in detail hereinbelow. For operation on system computer 22, the program instructions are written in the form of computer programs (e.g., in C++ or in any other object-oriented language) stored in computer-readable memory, such as program disk storage device 31 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29 for later use and further analysis. Keyboard 26 and pointing device 25 (e.g., a mouse, trackball, or the like) are provided with system computer 22 to enable interactive operation. As noted, system computer 22 is able to communicate with disk storage devices 29, 31, 32, including external hard disk storage on a network and floppy disk drives. As noted above, analysis computer system 30 is typically located at a data center remote from the location of well W, but may alternatively be deployed thereat when desired.

Figure 4:
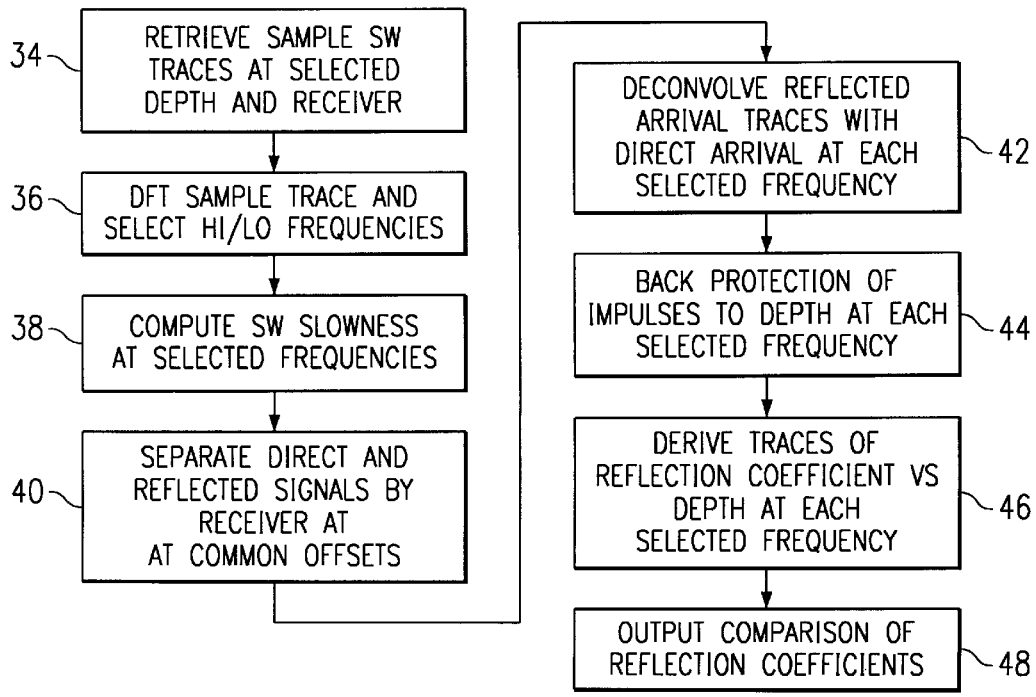
FIG. 4 is a flow diagram illustrating a method of processing well log signals according to the preferred embodiments of the present invention.

Referring now to FIG. 4, the method of operating analysis computer system 30 to process the well log signals generated by tool 20, according to the preferred embodiment of the present invention, will now be described in detail. Prior to the initiation of the process of FIG. 4, the appropriate Stoneley wave well log data for the desired wellbore WB will have already been taken, and the digital signals corresponding to the measurements from each receiver R, at each depth within wellbore WB, and in response to the broadband acoustic energy imparted by source S, will have been communicated along wireline 15 to recording station 10, and from recording station 10 to analysis computer system 30.

The process begins in process 34 of FIG. 4, in which system computer 22 retrieves (from its memory or from disk storage device 32) one or more sample time-domain traces from the obtained well log. The particular one or more traces retrieved in process 34 need not be selected with any particular precision, except that the retrieved trace or traces should correspond to an area in which wellbore WB is in gauge, to the extent possible. In addition, the retrieved traces should contain arrivals that are somewhat representative in shape to those in other traces, so that the frequency domain information contained in the retrieved traces is representative of that contained in the other traces. If desired, a comparison of the retrieved trace or traces with those from other receivers at other depths may be performed, as a quality control check on the retrieved signals.

Following retrieval process 34, system computer 22 next converts the retrieved traces into the frequency domain, to generate a power spectrum therefrom, in process 36. As is well-known in the art, the time-domain to frequency-domain conversion of process 36 may be implemented by way of a discrete Fourier transform (DFT), such as one of the well-known variations of the Fast Fourier Transform (FFT). Based upon this conversion, a sample frequency spectrum can be analyzed by system computer 22, from which at least two frequencies of interest may be selected for use in the analysis process.

Figure 5:
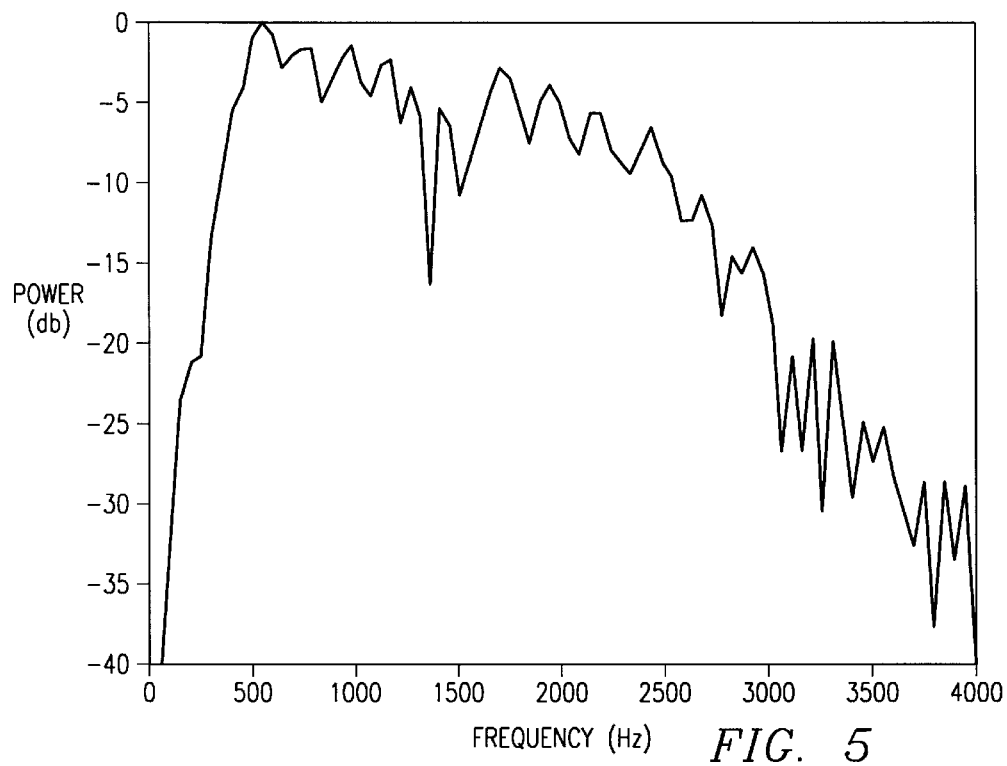
FIG. 5 is an exemplary plot of signal amplitude versus frequency of Stoneley wave transmission and detection according to the preferred embodiments of the present invention.

FIG. 5 illustrates a sample frequency spectrum for a Stoneley wave signal obtained at a selected depth by a selected one of receivers R in tool 20. The frequency against which the power is plotted refers to the frequency of the acoustic energy as received by receiver R, including both direct and reflected arrivals. As evident in this example that utilizes the DSI tool noted above, significant energy (e.g., >−20 dB) is present at frequencies between about 500 Hz and about 3000 Hz.

Figure 6:
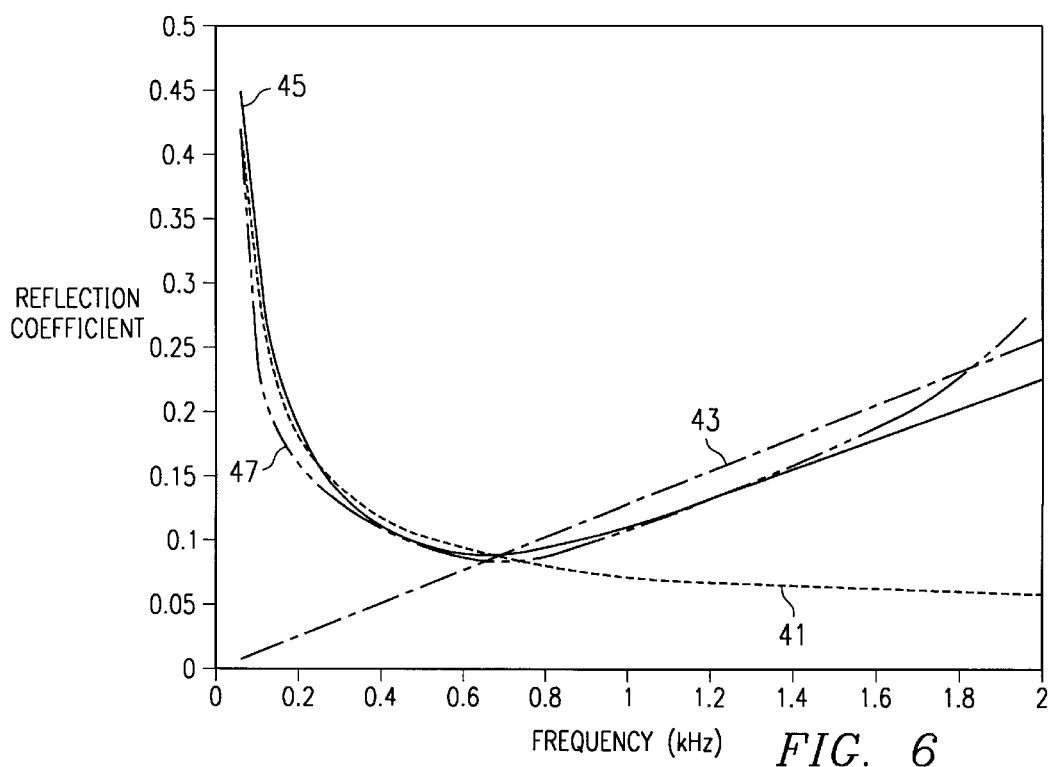
FIG. 6 is a set of exemplary plots illustrating the frequency-dependence of Stoneley wave reflection coefficient for various features along a wellbore.

As noted above, the detected energy at any one of receivers R includes both direct and reflected energy. In the determination of the location and nature of reflecting features such as fractures, caves, and washouts, however, it is of course the reflecting energy that is of particular importance. Furthermore, as described in the Kostek et al. articles noted above, the frequency response of a fracture differs from that of a cave or washout, and also differs from that of a fracture combined with a washout. FIG. 6 illustrates theoretical or modeled plots of reflection coefficient of frequency, with the theoretical or analytical plots derived according to the Kostek et al. articles cited above. Plot 41 is a theoretical plot of reflection for a pure fracture, such as fracture F in FIG. 2; the frequency behavior of fracture F indicates high reflectivity at low frequencies and low reflectivity at high frequencies. Plot 43 illustrates theoretical reflectivity of a cave feature, in which high reflectivity is exhibited at high frequencies and low reflectivity at low frequencies. Plot 45 is a theoretical plot of reflectivity of a fracture having a cave at the wellbore; plot 47 is a finite difference model of this same feature. As evident from plots 45, 47 (which agree quite well with one another), a cave at a fracture location exhibits high reflectivity at both low and high frequencies (presumably, the fracture provides the low frequency reflections while the cave provides high frequency reflections). This frequency-dependent behavior of these structures is used to advantage according to the preferred embodiment of the invention.

Referring back to process 36 of FIG. 4, system computer 22 next selects at least two frequencies of interest for its analysis, generally in response to inputs from a human operator via keyboard 26 or pointing device 25, based on the spectral analysis of the retrieved traces. Considering the relative reflectivity versus frequency plots of FIG. 6, the frequencies selected in process 36 according to the preferred embodiment of the invention preferably include relatively low and high frequencies at which significant energy is detectable by tool 20. According to the preferred embodiment of the invention, therefore, system computer 22 in process 36 selects approximately the lowest and highest frequencies having energy above a certain threshold power, based upon the power spectrum of the retrieved trace. In the example of FIG. 5, an example of a good selected low frequency is at about 600 Hz, while an example of a good selected high frequency is at about 2000 Hz. While additional frequencies between these extremes may also be selected, such additional data are not contemplated to provide improved interpretation (considering, from FIG. 6, that both fractures and caves have similar reflectivity at such middle frequencies).

As evident from FIG. 6, the reflection coefficients from fractures versus caves differs most widely at extremely low frequencies. It is therefore preferred that the selected low frequency be as low as possible. As shown in FIG. 5, the DSI Dipole Shear Sonic Imager tool available from Schlumberger is not particularly well suited for detecting signals at frequencies lower than about 500 Hz, however. While the DSI tool is certainly usable in connection with the present invention, as will be described below, it is contemplated that another realization of tool 20 that has even lower frequency capability than that of the DSI tool would be even more preferable. For example, a tool having a low frequency acoustic source drive, such as those used in cross-well seismic measurements, in combination with an array of hydrophones as the receivers, is likely to be capable of lower frequency operation and measurement. It is contemplated that those of ordinary skill in the art having reference to this specification will be capable of adapting modern equipment in this manner, or in other ways, to provide measurements at still lower frequencies, should such measurements be necessary or available.

Referring back to FIG. 4, once the high and low frequencies of interest are selected, system computer 22 performs process 38 to determine the Stoneley wave velocities at those frequencies. More specifically, process 38 determines the "slowness", or reciprocal of velocity, of Stoneley waves at those frequencies, as the slowness parameter is more useful in the stacking of reflected arrivals from the time-domain log signals than is velocity. According to the preferred embodiment of the invention, process 38 may be carried out in a manner similar to that used in deriving moveout velocities for seismic survey traces of common midpoint and varying offset. A preferred approach of determining the slowness is a frequency domain approach, as described in Lang, "Estimating slowness dispersion from arrays of sonic logging waveforms," Geophysics, Vol. 52, No. 4 (April, 1987), pp. 530–544. According to this, and other, slowness determination methods, a slowness value will be provided at individual frequencies, including at the low and high frequencies selected in process 36.

Other techniques for determining the Stoneley wave slowness at the selected frequencies may alternatively be used in process 38. For example, time-domain arrival traces may be band-pass filtered to a frequency band centered on the selected low frequency, and the velocity, or slowness, of the direct Stoneley wave arrivals in this low frequency band derived by way of the STC (Slowness Time Coherence) approach described in Kimball and Marzetta, "Semblance processing of borehole acoustic array data", Geophysics, Vol. 49 (1984), pp. 274–281. The retrieved traces are then again band-pass filtered to a band centered on the selected high frequency, and the slowness at this high frequency derived in similar manner. Other alternative methods of deriving the wave slowness parameters may also be used.

Figure 7:
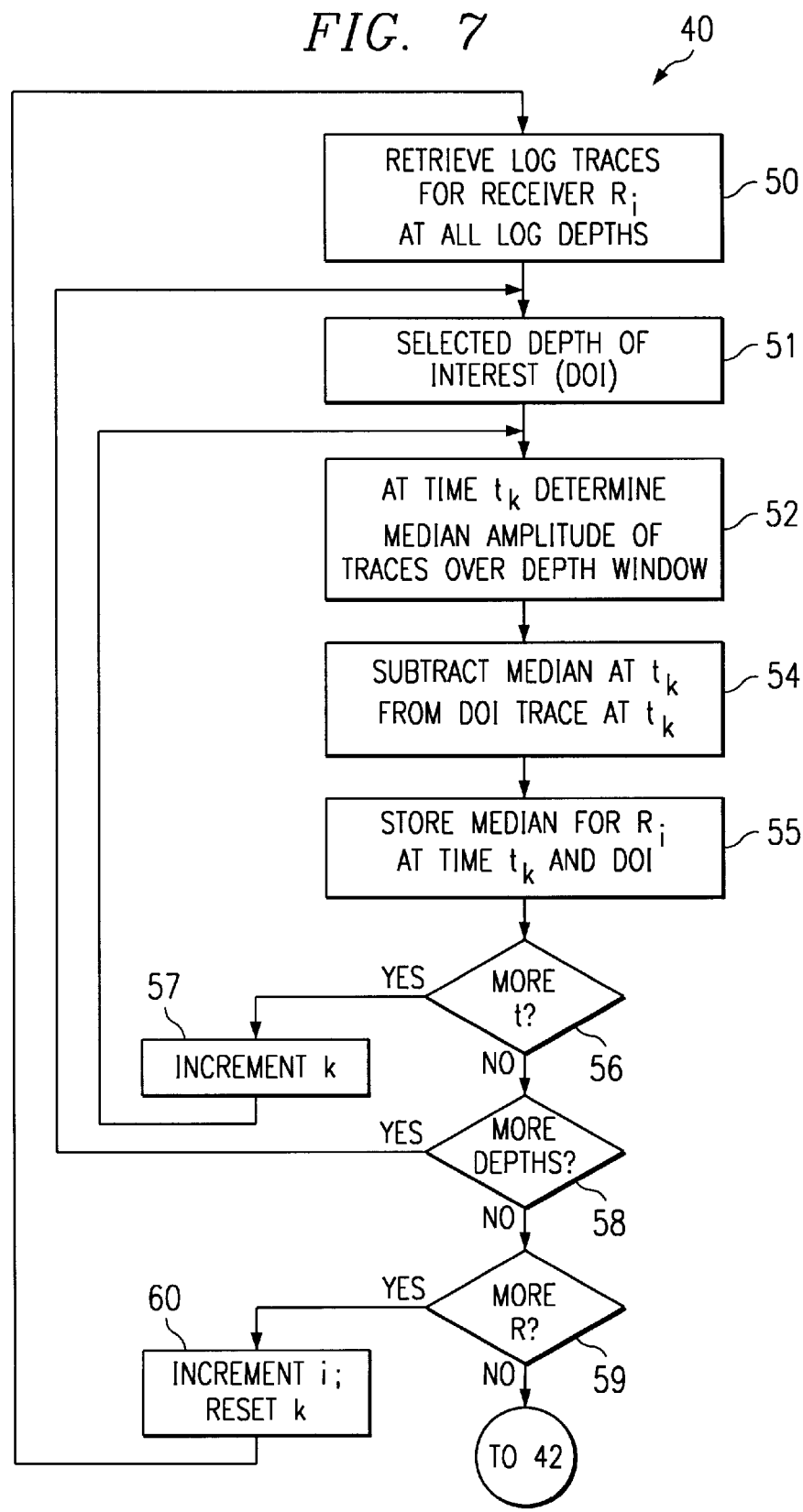
FIG. 7 is a flow chart illustrating a method of separating direct arrivals from reflected arrivals of Stoneley waves as detected by a well log tool in the method of FIG. 4, according to the preferred embodiments of the present invention.

Upon determination of the Stoneley wave slowness at the selected low and high frequencies, system computer 22 next performs process 40 to separate the direct arrival and reflected arrival events from each of the traces for each of receivers R at each logged depth. Referring now to FIG. 7, the steps of process 40 to separate these arrivals from one another, according to the preferred embodiment of the present invention, will now be described in detail.

As illustrated in FIG. 7, process 40 begins with system computer 22 retrieving, from memory or disk storage device 29, the digital waveform data for a particular receiver $R_i$ at all log depths, in process 50. In effect, process 50 creates a "gather" of constant offset traces over the logged depth of wellbore WB, with the offset of course corresponding to the separation distance between source S and receiver $R_i$ in tool 20. In process 51, system computer 22 next selects the current depth of interest, corresponding to the particular depth at which the reflected arrivals are to be separated in this pass.

In general, process 40 separates the reflected arrivals, in the trace at the current depth of interest, by subtracting an estimate of the direct arrival waveform from the overall digital waveform data of the trace. According to this preferred embodiment of the invention, the estimate of the direct arrival waveform is derived as the median of the digital waveform data, at each time sample, taken over the digital waveform data at the depth of interest and a group of neighboring depths. Accordingly, in process 52, system computer 22 retrieves the amplitude at a sample time $t_k$ in each of the constant offset traces retrieved in process 50 that correspond to depths within a defined depth window that is centered about the current depth of interest, and calculates a median value of these amplitudes at each depth position in the log. The depth window preferably corresponds to on the order of one wavelength of the Stoneley waves. The median amplitude value is an estimate of the direct arrival event at time $t_k$, considering that the time of the direct arrival of the Stoneley wave should be consistent at each depth (since the separation distance between source S and receiver $R_i$ does not vary with tool depth). In process 54, the median value at time $t_k$ is subtracted from the amplitude of each of the retrieved constant offset traces at time $t_k$, in effect to remove the direct arrival amplitude from the traces; the modified traces are then stored in memory. In process 55, system computer 22 stores the median value at time $t_k$ in memory, in association with receiver $R_i$, from which a direct arrival trace can later be derived for receiver $R_i$.

This estimation of the direct arrival and subtraction to derive the reflected arrivals is then repeated over time, and for each depth of interest. In decision 56, system computer 22 determines whether the current constant offset traces have additional time values remaining to be processed; if so (decision 56 is YES), time index k is incremented in process 57, and control passes back to process 52 via which the median amplitude value at a new time is calculated and subtracted from the traces. Once all time samples for the digital waveform data corresponding to the depth of interest have been processed (decision 56 is NO), system computer 22 next performs decision 58 to determine if reflected arrivals are to be separated from direct arrivals at additional depths of interest, for the same receiver $R_i$. If so (decision 58 is YES), control passes back to process 51 for the selection of the next depth of interest at which the separation of process 40 is to be applied; in this manner, the depth window over which the median value estimates are generated will shift in time along with the depth of interest Upon completion of processing for a receiver $R_i$ (decision 58 is NO), decision 59 is performed to determine if additional receivers R remain to be processed. If so (decision 59 is YES), receiver index i is incremented and time index k is reset to zero in process 60, and control passes back to process 50 for the retrieval and processing of the next constant offset well log gather. Upon completion of separation process 40 for all receivers R (decision 59 is NO), control passes to process 42 of FIG. 4.

Process 42 is performed by system computer 22 to produce impulse traces for each receiver $R_i$ over time, at each depth, so that the time at which each reflection arrives can be identified with some precision, especially in separating the contributions from closely spaced features along wellbore WB. The theory of deconvolution process 42 will now be described in detail.

One may consider, in the frequency domain, the direct Stoneley wave arrival $D(\omega)$ as the product of the impulse response $I(\omega)$ of the Stoneley wave and the source function $S(\omega)$ as follows:

$$D(\omega)=I(\omega)S(\omega)$$

In this example, impulse response $I(\omega)$ includes the transducer effects of source S and receivers R, as well as the coupling efficiency of source S into generation of the Stoneley wave. One may then express the reflected arrival $R(\omega)$ of the Stoneley wave at a receiver $R_i$ as:

$$R(\omega)=\bar{r}(\omega)I(\omega)S(\omega)$$

where $\bar{r}(\omega)$ is the Stoneley wave reflectivity of a reflection event. The combination of these equations leads one to express reflectivity $\bar{r}(\omega)$ as:

$$\bar{r}(\omega) = \frac{R(\omega)}{D(\omega)}$$

In other words, one may derive the reflectivity $\bar{r}(\omega)$ without knowledge of the source function $S(\omega)$ using a frequency-domain division or, equivalently, using time-domain deconvolution. The frequency response $D(\omega)$ of the direct arrival may tend to zero at individual frequencies. To provide a robust result, by avoiding divide-by-zero instances, it is preferred to replace the reflectivity function with a function based on the maximum signal. An example of such a reflectivity deconvolution process is described in Dey-Sarkar and Wiggins, "Source deconvolution of teleseismic P wave arrivals between 14° and 40°", *J. Geophys. Res.*, Vol. 81 (1976), pp. 3633–3641, incorporated herein by this reference. In his approach, a preferred expression for reflectivity $\bar{r}(\omega)$ is as follows:

$$\bar{r}(\omega) = \frac{R(\omega)D^*(\omega)}{\max[D(\omega)D^*(\omega), cK]}$$

where K is the peak value of the power spectrum of the direct Stoneley arrival $D(\omega)$, and where c is a scaling factor ranging between zero and one. With c=0, this modified function reduces reflectivity $\bar{r}(\omega)$ to the simple frequency domain ratio $R(\omega)/D(\omega)$; if c=1, the modified reflectivity reduces to:

$$\bar{r}(\omega) = \frac{R(\omega)D^*(\omega)}{K}$$

which is effectively the scaled cross-spectrum of the reflected Stoneley wave with the incident Stoneley wave arrival. The value of c is preferably selected so as to provide stability in the result.

Referring back to FIG. 4, deconvolution process 42 is thus preferably performed by way of frequency domain division, using the modified form for reflectivity $\bar{r}(\omega)$:

$$\bar{r}(\omega) = \frac{R(\omega)D^*(\omega)}{\max[D(\omega)D^*(\omega), cK]}$$

with value c=0.01. This frequency domain division is necessarily performed by applying a DFT (e.g., FFT) to the separated reflected signal and to the direct arrival waveform, and applying the frequency domain results to the reflectivity $\bar{r}(\omega)$ equation noted above. In order to consider the low and high frequencies selected in process 36, two resulting spectra are generated by multiplying the modified form for reflectivity $\bar{r}(\omega)$ by a Hamming window of approximately 1 kHz centered on the selected low and high frequencies, respectively. As a result, each trace within each common offset gather produces two deconvolution traces, one for each of the selected frequencies. Transformation of these traces into the time domain is then performed, by way of applying the appropriate inverse DFT to each of the deconvolved traces. The deconvolved time domain traces will, in general, be complex in form.

Figure 8:
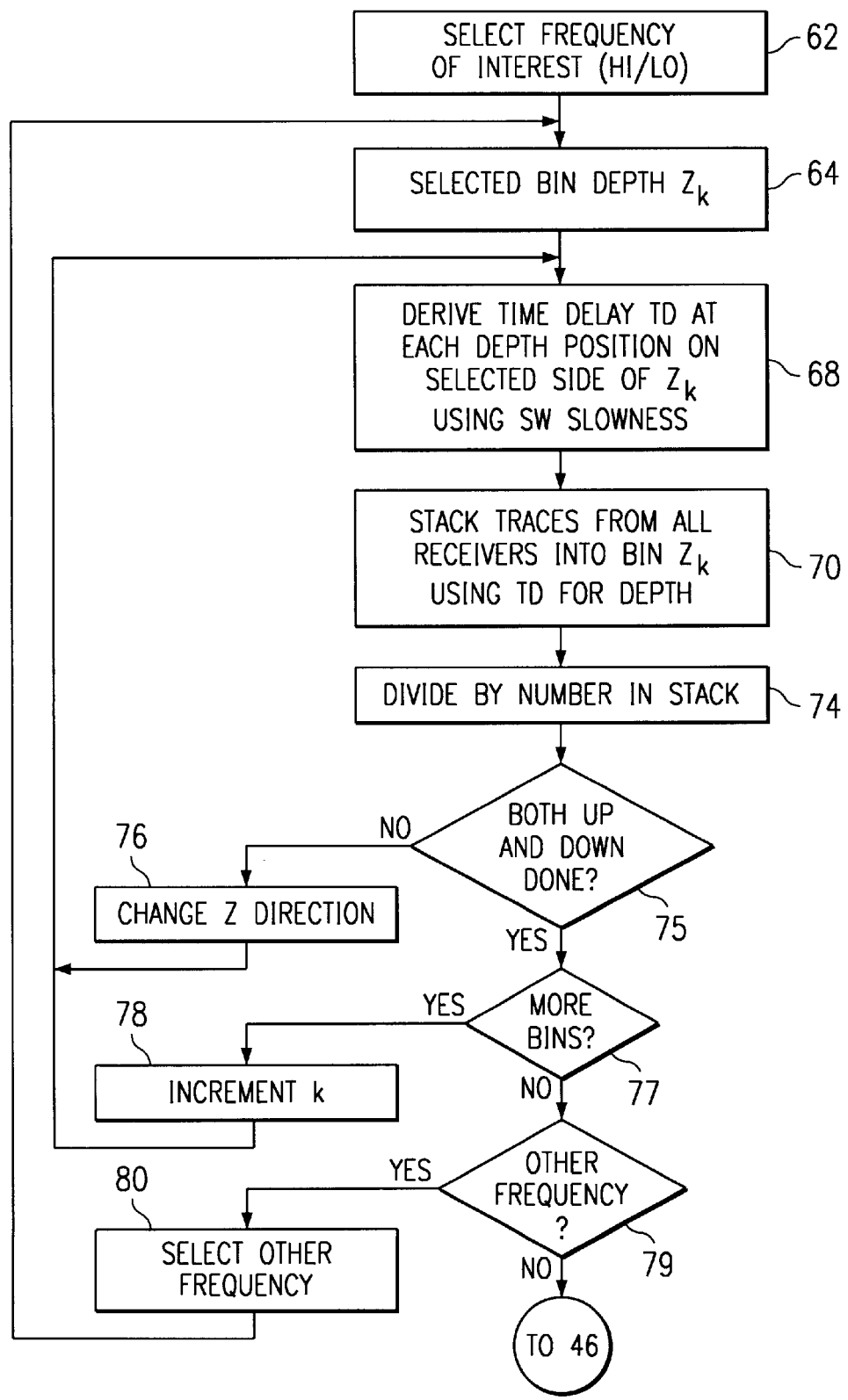
FIG. 8 is a flow chart illustrating a method of back-projection stacking as applied to deconvolved reflected arrivals in the method of FIG. 4, according to the preferred embodiments of the present invention.

In process 44, system computer 22 next performs a back-projection of the time-domain impulse traces to effectively create a stacked trace for each depth, at each of the selected low and high frequencies. Separate back-projections are generated for up-going and down-going waves, as will be apparent from the following description. These stacked traces will be used to generate reflectivity coefficients over depth, for each frequency, in process 46. Referring now to FIG. 8, the operation of process 44 will now be described in detail.

As shown in FIG. 8, process 44 begins with the selection of one of the selected frequencies (e.g., low or high) in process 62, as the back-projected traces are separately generated for each frequency. In process 64, an initial bin depth $z_k$ is selected for analysis.

For the selected offset distance, system computer 22 calculates, in process 68, a time delay for each depth position of interest on one selected side of the bin depth $z_k$ (i.e., in either the upgoing or downgoing direction). This time delay is used to account for the expected delay of reflection events with distance from any reflecting interface that may be present at bin depth $z_k$, in the stacking of reflection events from the deconvolved time domain traces. Accordingly, the parameters required for derivation of time delay TD is the selected depth offset of the depth position z from bin depth $z_k$, and a Stoneley wave slowness factor $\Delta t_{St}$ for the selected frequency, as determined in process 38 (FIG. 4), averaged over depth. In short, time delay TD may be expressed as a function of depth z as follows:

$$TD(z)=2|(z-z_k)|\Delta t_{St}$$

The factor of two is required in order to account for the two-way travel of the Stoneley wave to and from the originating depth of reflected Stoneley wave arrivals.

In process 70, stacking of traces at depths at and on one side of bin depth $z_k$, associated with all source-receiver pairs (and thus over varying offsets), into a bin associated with bin depth $z_k$, is now performed. According to the preferred embodiment of the invention, time windows of the traces (rather than amplitudes from discrete time points) are stacked, for purposes of efficiency. For example, a time window of 10 msec, ranging from the origin (t=0 msec) to 10 msec in the traces of all receivers R at bin depth $z_k$ may be first stored into the bin. This time-zero time window effectively corresponds to the assumption that a reflecting surface is present at bin depth $z_k$, in which case a reflection arrival would arrive at the corresponding receiver R virtually without delay. A time window of 10 msec from the traces (from all receivers R) at the next adjacent depth point $z_{+1}$ in one direction are then stacked into the bin, with a time shift of $TD(z_{+1})$; in other words, the time window from the traces at this adjacent time would be the time from $TD(z_{+1})$ to $(TD(z_{+1})+10$ msec). Time windows from traces at the other depth positions in the selected direction would similarly be stacked into the bin associated with depth $z_k$, shifted from the origin by the appropriate time delay $TD(z)$. A maximum time delay may be selected, for example as the total time of recording minus the window size (e.g., minus 10 msec), to ensure that a proper time window is stacked from each trace; traces associated with time delays outside of the maximum value would not be stacked into the current bin.

Upon completion of process 70 for the current depth $z_k$, system computer 22 divides the stacked trace at the current bin (for depth $z_k$) by the number of traces stacked thereinto, so as to normalize the resulting amplitude, considering that some bin depths may not have the full complement of traces stacked thereinto. In decision 75, system computer 22 then determines whether both the upgoing and downgoing directions have had stacks generated for the current bin; if not, the other direction is selected in process 76, and control passed to process 68 for generation of the opposite direction stack. Upon both the upgoing and downgoing stacks having been generated for the current bin depth $z_k$ (decision 75 is YES), system computer 22 then determines, in decision 77, whether additional bin depths remain to be stacked; if so (decision 77 is YES), bin depth index k is incremented in process 78, and control passes back to repeat processes 68, 70, 71, 74 for the next bin depth. Upon completion of all bins (decision 77 is NO), decision 79 determines if the other selected frequency remains to be back-projected. If so (decision 79 is YES), the other selected frequency is selected in process 80, and control passes back to process 64 for selection of the initial bin depth $z_k$ and repetition of the process at this other frequency. If all frequencies have been back-projected (decision 79 is NO), control passes to process 46 of FIG. 4, for generation of the reflectivity coefficient versus depth traces.

The operation of system computer 22 in performing process 46 according to a first preferred embodiment of the present invention will now be described in detail relative to FIG. 9*a*. According to this approach, system computer 22 selects one of the selected high or low frequencies for analysis in process 82, selects the bin depth $z_k$ of interest in process 84, and selects either the upgoing or downgoing stack for the selected bin in process 86.

In process 88, system computer 22 determines the envelope of the selected stack (i.e., at the selected bin depth $z_k$, for the selected direction and selected frequency), by applying the well-known envelope function thereto. As known in the art, the envelope function env{S(t)} of a signal S(t) corresponds to the following definition:

$$env\{S(t)\} = \sqrt{[S(t)]^2 + [Hi\{S(t)\}]^2}$$

where Hi{S(t)} is the Hilbert transform of the signal S(t). The envelope function is a well-known function used in the analysis of time-varying signals, such as seismic traces and well log traces. This function is applied to the selected complex stack signal, by system computer 22, in process 88.

According to the preferred embodiment of the invention, the value of the envelope signal for the selected bin, frequency, and direction, is then evaluated at t=0 by system computer 22 in process 90. This time-zero value is then stored in memory by system computer 22, as the reflection coefficient for the selected bin depth, frequency, and direction. Decision 91 is then performed by system computer 22, to determine if both upgoing and downgoing directions for the current bin depth and frequency have been processed into a reflection coefficient; if not (decision 91 is NO), control passes to process 86 in which system computer 22 selects the opposing direction from that previously processed, and a reflection coefficient is then derived for this opposing direction. Once both an upgoing reflection coefficient and a downgoing reflection coefficient are generated through instances of process 90 (decision 91 is YES), system computer 22 next performs process 92 to generate an average reflection coefficient for the selected bin and frequency, from the upgoing and downgoing reflection coefficients; system computer 22 then stores this average as the reflection coefficient for bin depth $z_k$ at the current selected frequency.

System computer 22 then determines, in decision 93, if additional bin depths remain to be processed; if so (decision 93 is YES), control passes back to process 84 in which system computer 22 selects the next bin depth to be processed. Upon all bins for the selected frequency being processed (decision 93 is NO), decision 95 is executed to determine if all of the selected frequencies have been analyzed in the current instance of process 46. If no (decision 95 is NO), control passes back to process 82 in which the other frequency (or another frequency, if more than two frequencies are involved) is selected, and process 46 repeated for all bin depths. Upon completion of both (or all) selected frequencies (decision 95 is YES), control passes to process 48 (FIG. 4).

An alternative approach to the detailed implementation of process 46, according to a second preferred embodiment of the invention, will now be described. This alternative approach is particularly beneficial in avoiding false positives due to lithology changes along wellbore WB (i.e., without a fracture at the interface). In this regard, consider that the Stoneley wave reflection coefficient from an interface between dissimilar strata may be derived as follows:

$$R_c = \frac{V_{St}^1 - V_{St}^2}{V_{St}^1 + V_{St}^2}$$

where the adjacent strata have Stoneley wave velocities $V_{St}^1$ and $V_{St}^2$, respectively. In this arrangement, Stoneley wave velocity $V_{St}^1$ is the velocity of the layer within which the tool is present and Stoneley wave velocity $V_{St}^1$ is the velocity of the layer away from the tool. Accordingly, the reflection coefficient of a Stoneley wave reflecting from a lithology change from one direction will be equal in magnitude to, but opposite in sign from, the reflection coefficient of an opposite-direction Stoneley wave reflecting from the same lithology change. The sum of the opposite-going reflection coefficients will therefore reduce to zero. Alternatively, the reflection coefficient produced by a fracture (i.e., filled with drilling fluid) has the same sign, regardless of direction of wave travel; the sum of upgoing and downgoing reflection coefficients from fractures (and caves and washouts, for that matter), will therefore reinforce one another. These relationships are used to advantage according to the second embodiment of the invention, as reflections from lithology changes will be attenuated relative to reflections from fractures and other fluid-filled features.

Referring now to FIG. 9*b*, process 46' according to this second preferred embodiment of the invention will now be described in detail. Process 46' begins with the selection, by system computer 22, of the desired frequency (process 96) and bin depth $z_k$ (process 98), similarly as before. In process 100, system computer retrieves both the upgoing and the downgoing back-projection stacks generated in process 44, for the current bin depth $z_k$ and selected frequency, and generates an average stack therefrom. As discussed above, the reflection coefficients of upgoing and downgoing waves generated by lithology changes will tend to cancel, while those generated by fractures, caves, and washouts, will tend to reinforce one another. Averaging process 100 of this embodiment of the invention sums the upgoing and downgoing stacks with one another, so that this attenuation and reinforcement takes place.

Following process 100, system computer 22 next applies the envelope function to the averaged stack in process 102, similarly as in the case of process 46 of FIG. 9*a*. In process 104, system computer 22 then evaluates the value of the envelope function at time t=0, and stores this value, in memory, as the reflection coefficient associated with bin depth $z_k$. This process is then repeated for each bin depth $z_k$, through the operation of decision 105, and for both (or all) of the selected frequencies through the operation of decisions 107, similarly as described above. Upon all bins having been processed (decision 105 is NO) for all selected frequencies (decision 107 is YES), process 46' is complete for this well log, and control passes to process 48 (FIG. 4).

In either of the preferred embodiments of the present invention described hereinabove relative to FIGS. 9a and 9b, the result of process 46, 46' is a depth trace of a Stoneley wave reflection coefficient for each of the frequencies originally selected (process 36). According to the present invention, a human analyst or an automated analysis program can now perform a comparison, of these reflection coefficients with one another, over the depth of the well log. This comparison can be used to identify not only the location of a fracture or other feature along the wellbore, but also provides information regarding the nature of the feature. In particular, the present invention provides the capability of distinguishing between fractures (which are petrophysically interesting), and caves or washouts (which are generally artifacts of the drilling process).

Referring back to FIG. 4 in this regard, process 48 is performed by system computer 22 to output a comparison of the appropriate reflection coefficient traces, for the selected frequencies, as a function of depth along wellbore WB, in the appropriate manner. For example, process 48 may include the generation of hard copy output of the traces on printer 28, or display of the traces on display monitor 27, in such a manner that a human analyst can analyze the reflection behavior.

Figure 10A:
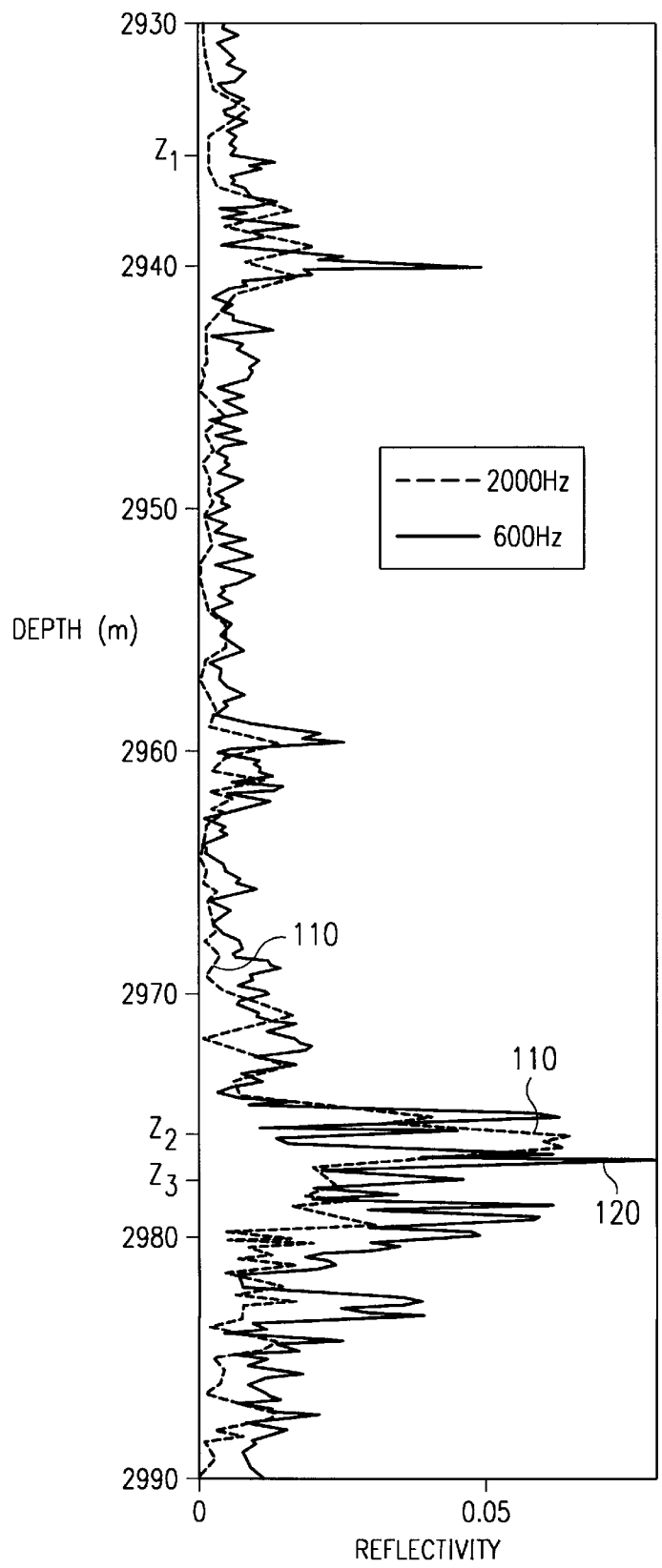
FIG. 10*a* is an exemplary set of comparison plots of reflection coefficient versus depth for low and high frequency Stoneley waves, from which fractures and other features may be identified according to the preferred embodiments of the present invention.

FIG. 10a illustrates an example of a comparison of reflection coefficient traces generated according to the preferred embodiment of the invention. In this example, trace 110 is a trace of reflection coefficient versus depth for Stoneley waves at a frequency of about 600 Hz, while trace 120 is a trace of reflection coefficient versus depth for Stoneley waves at a frequency of about 2000 Hz. Depth $z_1$ in FIG. 10a can be identified as a potential fracture location, as the amplitude of low frequency reflection coefficient trace 110 is relatively high; no cave or washout is likely to be present at depth $z_1$, since the amplitude of high low frequency reflection coefficient trace 120 is relatively low thereat. Conversely, depth $z_2$ in FIG. 10a can be identified as a location at which a fracture is not present, but a cave or washout is likely to be present, because the amplitude of low frequency reflection coefficient trace 110 is relatively low, but the amplitude of high low frequency reflection coefficient trace 120 is relatively high, at this depth. Depth $z_3$ may be interpreted to correspond to a location at which both a fracture and a cave may be located, considering that the amplitudes of the low and high frequency reflection coefficient traces 110, 120, respectively, are both relatively high. As evident from FIG. 10a, the human analyst is readily able to identify these features from the traces generated by the method according to the preferred embodiments of the invention.

Alternatively, automated analysis may be performed in process 48. In this approach, system computer 22 would typically store the reflection coefficient data in memory or disk storage device 32 and, at the desired time, apply a certain set of rules or other automated decision processes to the traces so as to identify the depths at which potential fractures may reside, to the exclusion of caves, washouts, breakouts, and other artifacts.

According to an alternative embodiment of the present invention, the automated analysis may include the derivation of an estimate of the widths of the identified fractures. An exemplary implementation of a fracture width estimation procedure, as applied to the results of the foregoing fracture identification process, will now be described relative to FIG. 11.

This portion of analysis process 48 begins, in process 110, with system computer 22 retrieving, from memory, a trace of reflection coefficient $R_c$ for wellbore WB at one of the selected frequencies. Preferably, retrieval process 110 retrieves the lowest frequency reflection coefficient trace. Additionally, some measure of the diameter of wellbore WB over depth is also retrieved in process 110, such as from a caliper log of wellbore WB. In process 112, an initial depth z at which the fracture width analysis is to be performed is selected, and a fracture width value a is initialized to zero in process 114.

In process 116, system computer 22 evaluates a theoretical reflection coefficient $R_e(z)$ for depth z, and for a frequency corresponding to the selected frequency of the retrieved reflection coefficients $R_c$, for wellbore WB. The evaluation of process 116 may be carried out according to any one of a number of theoretical expressions for reflection coefficient, with the selected expression including those parameters for which compensation is desired. A relatively simple expression for theoretical reflection coefficient $R_e(z)$ is given in Hornby, et al., "Fracture evaluation using reflected Stoneley-wave arrivals", Geophysics, Vol. 54, No. 10 (October 1989), pp. 1274–1288, and in Kostek, et al., "The interaction of tube waves with wellbore fractures, Part II: Analytical models", Geophysics, Vol. 63, No. 3 (May-June 1998), pp. 809–815, as follows:

$$R_e(z) = \frac{\frac{idH_1^{(1)}(qa)}{aH_0^{(1)}(qa)}}{1 + \frac{idH_1^{(1)}(qa)}{aH_0^{(1)}(qa)}}$$

where a is the trial width value for this instance of process 116, d is the diameter of wellbore WB at depth z. The parameter q is the wave-number for the Stoneley wave of the selected frequency, and as such corresponds to a ratio of the selected frequency ω to the acoustic velocity c in the drilling fluid; as is well known in the art, the acoustic velocity c may be derived in terms of the bulk modulus $K_f$ of the fluid and its density $\rho_f$, by the expression.

$$c = \sqrt{\frac{K_f}{\rho_f}}.$$

The functions $H_i^{(1)}$ refer to the outgoing Hankel function of order i, as is explained in the Hornby, et al. paper.

Other, more complicated, expressions may alternatively be used in process 116. For example, parameters such as pressure and shear wave velocities may be incorporated into the evaluation, particularly in compensating for the effects of elasticity in the formation as described in Kostek, et al., "The interaction of tube waves with wellbore fractures, Part II: Analytical models", Geophysics, Vol. 63, No. 3 (May-June 1998), pp. 809–815, incorporated herein by this reference. In addition, one may account for the angle at which the fracture intersects wellbore WB, as described in the above-incorporated Hornby, et al. reference. Other implementations of these, and similar, expressions for reflection coefficient may be used, as well.

Following process 116, system computer 122 executes decision 117 to compare the estimated theoretical reflection coefficient $R_e(z)$ from process 116 against the actual reflection coefficient $R_c(z)$ determined, at the selected frequency, from process 46. Decision 117 effectively tests the current value of width a, by this comparison of reflection coefficient frequency. If the difference between the reflection coefficients is greater than a selected limit ε (decision 117 is NO), the current trial width value a does not correspond to the actual width of the fracture at depth z; process 118 is performed to increment width value a by a small amount (e.g., on the order of six inches), and control passes back to process 116 for re-evaluation of the theoretical reflection coefficient $R_e(z)$ for this new trial width value a. Upon the theoretical reflection coefficient $R_e(z)$ approaching the measured reflection coefficient $R_c(z)$ (decision 117 is YES), the current width value a is stored in memory, as the correct fracture width, in association with the current depth z. Decision 121 then determines whether additional depths remain to be analyzed; if so (decision 121 is YES), process 122 adjusts depth z accordingly, and passes control back to process 114 for initialization of the width value a, and determination of the fracture width at this new depth via process 116 and decision 117. Upon all widths being completed (decision 121 is NO), this portion of analysis process 28 is complete.

Figure 10B:
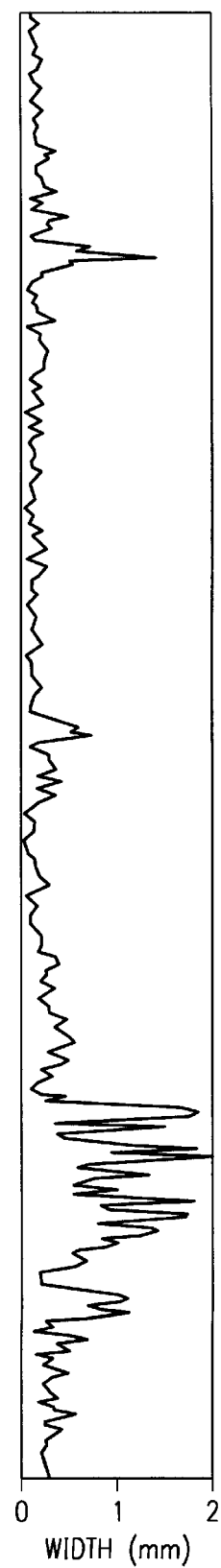
FIG. 10*b* is a plot of estimated fracture width corresponding to the reflection coefficient plots of FIG. 10*a*.

The result of the width analysis portion of process 48, as described above, is a fracture width log over depth. An example of such a log is illustrated in FIG. 10b, for the reflection coefficient traces of FIG. 10a. Armed with such a log as that shown in FIG. 10b, the analyst may readily interpret the traces, primarily through identification of those depths at which a peak width corresponds to a reflection coefficient peak and analysis of the derived widths thereat.

The present invention provides the important advantages of an automated manner by way of which fractures may be identified from Stoneley wave well logs, with a reduced frequency of false positives and false negatives that may otherwise be caused by caves, washouts, breakouts, and other drilling artifacts. One alternative implementation can provide the additional advantage of attenuating the effects of reflections from lithology changes, further removing another source of false positives. The present invention is also particularly well-suited for implementation as an automated program, as may be carried out on modern computer systems and workstations. Fracture width may be readily derived in an automated manner according to the present invention.

Further in the alternative, it has been observed, in connection with the present invention, that the Stoneley wave reflection events are not only confined in frequency for purposes of analysis, but are also confined in time due to the impulse nature of the source Stoneley wave. It is therefore contemplated, according to the present invention, that a time-frequency analysis, such as that provided by way of wavelet signal processing, may be utilized in connection with the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to analyze a set of well log signals to identify fracture formations along a wellbore, the well log signals corresponding to Stoneley waves generated by a source in a well log tool at a plurality of depths in the wellbore, and detected by a plurality of downhole receivers in a well log tool at the plurality of depths, comprising the steps of:

selecting at least first and second frequencies of analysis, the first frequency being lower than the second frequency;

generating a first reflection coefficient trace corresponding to the reflectivity of Stoneley waves of the first frequency at each of the plurality of depths;

generating a second reflection coefficient trace corresponding to the reflectivity of Stoneley waves of the second frequency at each of the plurality of depths; and comparing the first and second reflection coefficient traces with one another over the plurality of depths, to identify the depths at which fractures and drilling artifacts are present along the wellbore.

2. The method of claim 1, further comprising:

for each of the well log signals from each of the receivers at each of the depths, separating reflection signals therefrom to generate a plurality of reflected arrival traces;

wherein the steps of generating first and second reflection coefficient traces are performed upon the separated reflection signals.

3. The method of claim 2, wherein the step of generating the first reflection coefficient trace comprises:

deconvolving each of the reflected arrival traces with a signal corresponding to a direct arrival event, to produce a first plurality of impulse traces associated with the first frequency;

back-projecting a plurality of groups of the first plurality of impulse traces into a plurality of first stacked impulse traces, one associated with each of the plurality of depths; and deriving a first frequency reflection coefficient at each of the plurality of depths, from an evaluation of the associated first stacked impulse trace;

and wherein the step of generating the second reflection coefficient trace comprises:

deconvolving each of the reflected arrival traces with a signal corresponding to a direct arrival event, to produce a second plurality of impulse traces associated with the second frequency;

back-projecting a plurality of groups of the second plurality of impulse traces into a plurality of second stacked impulse traces, one associated with each of the plurality of depths; and deriving a second frequency reflection coefficient at each of the plurality of depths, from an evaluation of the associated second stacked impulse trace.

4. The method of claim 3, wherein the deconvolving step to produce a first plurality of impulse traces comprises:

performing a frequency-domain division of a frequency spectrum of each reflected arrival trace with a frequency spectrum of the direct arrival event; and applying a filter window to the frequency-domain division with a pass band centered about the first frequency;

and wherein the deconvolving step to produce a second plurality of impulse traces comprises:

performing a frequency-domain division of a frequency spectrum of each reflected arrival trace with a frequency spectrum of the direct arrival event; and applying a filter window to the frequency-domain division with a pass band centered about the second frequency.

5. The method of claim 3, wherein the step of back-projecting each of a group of the first plurality of impulse traces into a first stacked impulse trace comprises, for each of the plurality of depths:

selecting a depth of interest;

deriving a time delay for each of the group of depths on a first side of the depth of interest;

for each of the group of depths, summing a portion of the associated impulse trace from each of the plurality of receivers into its associated first stacked impulse trace, where the portion of the associated impulse trace is selected according to the derived time delay for its depth; and dividing the amplitude of the associated first stacked impulse trace by the number of depths in the group of depths;

repeating the deriving, summing, and dividing steps for each of a group of depths on a second side of the depth of interest, so that both a first upgoing stacked impulse trace and a first downgoing stacked impulse trace is derived for the depth of interest;

wherein the step of back-projecting each of a group of the second plurality of impulse traces into a second stacked impulse trace comprises, for each of the plurality of depths:

selecting a depth of interest;

deriving a time delay for each of the group of depths on a second side of the depth of interest;

for each of the group of depths, summing a portion of the associated impulse trace from each of the plurality of receivers into its associated second stacked impulse trace, where the portion of the associated impulse trace is selected according to the derived time delay for its depth; and dividing the amplitude of the associated second stacked impulse trace by the number of depths in the group of depths;

repeating the deriving, summing, and dividing steps for each of a group of depths on a second side of the depth of interest, so that both a second upgoing stacked impulse trace and a second downgoing stacked impulse trace is derived for the depth of interest.

6. The method of claim 5, wherein the step of deriving a first frequency reflection coefficient comprises, for each of the plurality of depths:

applying an envelope function to the first upgoing stacked impulse trace at the depth;

evaluating the envelope function of the first upgoing stacked impulse trace at an origin point;

applying an envelope function to the first downgoing stacked impulse trace at the depth;

evaluating the envelope function of the first downgoing stacked impulse trace at the origin point;

averaging the evaluated envelope functions at the depth to produce the first frequency reflection coefficient thereat;

wherein the step of deriving a second frequency reflection coefficient comprises, for each of the plurality of depths:

applying an envelope function to the second upgoing stacked impulse trace at the depth;

evaluating the envelope function of the second upgoing stacked impulse trace at an origin point;

applying an envelope function to the second downgoing stacked impulse trace at the depth;

evaluating the envelope function of the second downgoing stacked impulse trace at the origin point;

averaging the evaluated envelope functions at the depth to produce the second frequency reflection coefficient thereat.

7. The method of claim 5, wherein the step of deriving a first frequency reflection coefficient comprises, for each of the plurality of depths:

averaging the first upgoing and first downgoing stacked impulse traces for the depth;

applying an envelope function to the averaged first upgoing and downgoing stacked impulse traces; and evaluating the envelope function at the origin point depth to produce the first frequency reflection coefficient;

wherein the step of deriving a second frequency reflection coefficient comprises, for each of the plurality of depths:

averaging the second upgoing and second downgoing stacked impulse traces for the depth;

applying an envelope function to the averaged second upgoing and downgoing stacked impulse traces; and evaluating the envelope function at the origin point depth to produce the second frequency reflection coefficient.

8. The method of claim 2, wherein the separating step comprises:

selecting a first gather of common source-receiver offset well log signals;

at each of a plurality of time points, determining a median amplitude of the signals in the first gather;

subtracting the median amplitude from the amplitude of each of the signals in the first gather at the corresponding time point, to produce a reflected arrival trace for each of the signals in the first gather;

repeating the determining and subtracting steps for the first gather at each of a plurality of depths; and repeating the selecting, determining, subtracting, and repeating steps for a gather associated with each of the receivers in the well log tool.

9. The method of claim 1, further comprising:

generating a trace of fracture width over the plurality of depths, using a selected one of the first and second reflection coefficient traces.

10. A computer system, for analyzing a set of well log signals to identify fracture formations along a wellbore, the well log signals corresponding to Stoneley waves generated by a source in a well log tool at a plurality of depths in the wellbore, and detected by a plurality of downhole receivers in a well log tool at the plurality of depths, comprising:

a memory, for storing program instructions and data;

an output device;

a system computer, coupled to receive the well log signals and store the same in memory, coupled to the output device, and programmed to perform the operations of:

selecting at least first and second frequencies of analysis, the first frequency being lower than the second frequency;

generating a first reflection coefficient trace corresponding to the reflectivity of Stoneley waves of the first frequency at each of the plurality of depths;

generating a second reflection coefficient trace corresponding to the reflectivity of Stoneley waves of the second frequency at each of the plurality of depths; and presenting, to the output device, a comparison of the first and second reflection coefficient traces with one another over the plurality of depths, to identify the depths at which fractures and drilling artifacts are present along the wellbore.

11. The system of claim 10, further comprising:

for each of the well log signals from each of the receivers at each of the depths, separating reflection signals therefrom to generate a plurality of reflected arrival traces;

wherein the steps of generating first and second reflection coefficient traces are performed upon the separated reflection signals.

12. The system of claim 11, wherein the system computer is programmed to perform the operation of generating the first reflection coefficient trace by performing the steps of:

deconvolving each of the reflected arrival traces with a signal corresponding to a direct arrival event, to produce a first plurality of impulse traces associated with the first frequency;

back-projecting a plurality of groups of the first plurality of impulse traces into a plurality of first stacked impulse traces, one associated with each of the plurality of depths; and deriving a first frequency reflection coefficient at each of the plurality of depths, from an evaluation of the associated first stacked impulse trace;

and wherein the system computer is programmed to perform the operation of generating the second reflection coefficient trace by performing the steps of:

deconvolving each of the reflected arrival traces with a signal corresponding to a direct arrival event, to produce a second plurality of impulse traces associated with the second frequency;

back-projecting a plurality of groups of the second plurality of impulse traces into a plurality of second stacked impulse traces, one associated with each of the plurality of depths; and deriving a second frequency reflection coefficient at each of the plurality of depths, from an evaluation of the associated second stacked impulse trace.

13. The system of claim 12, wherein the system computer is programmed to perform the deconvolving operation to produce a first plurality of impulse traces by performing the steps of:

performing a frequency-domain division of a frequency spectrum of each reflected arrival trace with a frequency spectrum of the direct arrival event; and applying a filter window to the frequency-domain division with a pass band centered about the first frequency;

and wherein the system computer is programmed to perform the deconvolving operation to produce a second plurality of impulse traces by performing the steps of:

performing a frequency-domain division of a frequency spectrum of each reflected arrival trace with a frequency spectrum of the direct arrival event; and applying a filter window to the frequency-domain division with a pass band centered about the second frequency.

14. The system of claim 12, wherein the system computer is programmed to perform the operation of back-projecting each of a group of the first plurality of impulse traces into a first stacked impulse trace by performing, for each of the plurality of depths, the steps of:

selecting a depth of interest;

deriving a time delay for each of the group of depths on a first side of the depth of interest;

for each of the group of depths, summing a portion of the associated impulse trace from each of the plurality of receivers into its associated first stacked impulse trace, where the portion of the associated impulse trace is selected according to the derived time delay for its depth; and dividing the amplitude of the associated first stacked impulse trace by the number of depths in the group of depths;

repeating the deriving, summing, and dividing steps for each of a group of depths on a second side of the depth of interest, so that both a first upgoing stacked impulse trace and a first downgoing stacked impulse trace is derived for the depth of interest;

wherein the system computer is programmed to perform the operation of back-projecting each of a group of the second plurality of impulse traces into a second stacked impulse trace by performing, for each of the plurality of depths, the steps of:

selecting a depth of interest;

deriving a time delay for each of the group of depths on a second side of the depth of interest;

for each of the group of depths, summing a portion of the associated impulse trace from each of the plurality of receivers into its associated second stacked impulse trace, where the portion of the associated impulse trace is selected according to the derived time delay for its depth; and dividing the amplitude of the associated second stacked impulse trace by the number of depths in the group of depths;

repeating the deriving, summing, and dividing steps for each of a group of depths on a second side of the depth of interest, so that both a second upgoing stacked impulse trace and a second downgoing stacked impulse trace is derived for the depth of interest.

15. The system of claim 14, wherein the step of deriving a first frequency reflection coefficient comprises, for each of the plurality of depths:

applying an envelope function to the first upgoing stacked impulse trace at the depth;

evaluating the envelope function of the first upgoing stacked impulse trace at an origin point;

applying an envelope function to the first downgoing stacked impulse trace at the depth;

evaluating the envelope function of the first downgoing stacked impulse trace at the origin point;

averaging the evaluated envelope functions at the depth to produce the first frequency reflection coefficient thereat;

wherein the step of deriving a second frequency reflection coefficient comprises, for each of the plurality of depths:

applying an envelope function to the second upgoing stacked impulse trace at the depth;

evaluating the envelope function of the second upgoing stacked impulse trace at an origin point;

applying an envelope function to the second downgoing stacked impulse trace at the depth;

evaluating the envelope function of the second downgoing stacked impulse trace at the origin point;

averaging the evaluated envelope functions at the depth to produce the second frequency reflection coefficient thereat.

16. The system of claim 14, wherein the step of deriving a first frequency reflection coefficient comprises, for each of the plurality of depths:

averaging the first upgoing and first downgoing stacked impulse traces for the depth;

applying an envelope function to the averaged first upgoing and downgoing stacked impulse traces; and evaluating the envelope function at the origin point depth to produce the first frequency reflection coefficient;

wherein the step of deriving a second frequency reflection coefficient comprises, for each of the plurality of depths:

averaging the second upgoing and second downgoing stacked impulse traces for the depth;

applying an envelope function to the averaged second upgoing and downgoing stacked impulse traces; and evaluating the envelope function at the origin point depth to produce the second frequency reflection coefficient.

17. The system of claim 11, wherein the computer is programmed to perform the separating operation by performing a sequence of steps comprising:

selecting a first gather of common source-receiver offset well log signals;

at each of a plurality of time points, determining the median amplitude of the signals in the first gather;

subtracting the median amplitude from the amplitude of each of the signals in the first gather at the corresponding time point, to produce a reflected arrival trace for each of the signals in the first gather;

repeating the determining and subtracting steps for the first gather over a plurality of depths; and repeating the selecting, determining, and subtracting steps for a gather associated with each of the receivers in the well log tool.

18. The system of claim 10, wherein the system computer is further programmed to perform the operation of:

generating a trace of fracture width over the plurality of depths, using a selected one of the first and second reflection coefficient traces.

* * * * *

UNITED STATES PATENT AND TRADEMARK OFFICE
CERTIFICATE OF CORRECTION

PATENT NO. : 6,192,316 B1
DATED : February 20, 2001
INVENTOR(S) : Brian E. Hornby Page 1 of 1

It is certified that error appears in the above-identified patent and that said Letters Patent is hereby corrected as shown below:

Column 6,
Line 51, "network arrangement System computer" should read
-- network arrangement. System computer --

Column 10,
Line 41, "depth of interest Upon" should read -- depth of interest. Upon --

Column 11,
Line 3, "$R(\omega)=r(\omega) I (\omega) S (\omega)$" should read, -- $R(\omega)=r(\omega) I (\omega) S (\omega)$ --

Column 11,
Line 23, "In his approach, a preferred" should read -- In this approach, a preferred"

Column 16,
Line 64, "coefficient $R_d(z)$ from" should read "coefficient $R_e(z)$ from"

Signed and Sealed this

Twenty-second Day of January, 2002

Attest:

JAMES E. ROGAN
Attesting Officer
Director of the United States Patent and Trademark Office